(12) United States Patent
Kubota et al.

(10) Patent No.: US 9,098,076 B2
(45) Date of Patent: Aug. 4, 2015

(54) MANAGEMENT DEVICE OF EMISSION AMOUNT OR REDUCTION AMOUNT OF GREENHOUSE GASES, AND MANAGEMENT METHOD

(75) Inventors: Eiichiro Kubota, Tokyo (JP); Kazuyoshi Takemura, Tokyo (JP); Isao Soma, Saitama (JP)

(73) Assignee: Sony Corporation, Tokyo (JP)

( * ) Notice: Subject to any disclaimer, the term of this patent is extended or adjusted under 35 U.S.C. 154(b) by 220 days.

(21) Appl. No.: 13/192,850

(22) Filed: Jul. 28, 2011

(65) Prior Publication Data

US 2012/0042356 A1    Feb. 16, 2012

(30) Foreign Application Priority Data

Aug. 11, 2010 (JP) ................................ 2010-180091

(51) Int. Cl.
*G06F 17/30* (2006.01)
*G05B 15/02* (2006.01)

(52) U.S. Cl.
CPC ........ *G05B 15/02* (2013.01); *G05B 2219/2642* (2013.01)

(58) Field of Classification Search
CPC .......... G06Q 20/3226; G06Q 20/3227; G06Q 20/3278; A44B 15/005; F01N 11/00; G05B 15/02; G08B 13/19608; G08B 13/1968; H04M 1/7253
USPC .......... 726/2; 705/7, 7.38, 308; 235/439, 380; 361/737; 701/469
See application file for complete search history.

(56) References Cited

U.S. PATENT DOCUMENTS

| | | | |
|---|---|---|---|
| 6,594,154 B1* | 7/2003 | Brewer et al. | 361/801 |
| 7,274,301 B1* | 9/2007 | Smith et al. | 340/692 |
| 2007/0255457 A1* | 11/2007 | Whitcomb et al. | 700/273 |
| 2008/0185433 A1* | 8/2008 | Ando et al. | 235/439 |
| 2010/0042453 A1* | 2/2010 | Scaramellino et al. | 705/7 |
| 2010/0070316 A1 | 3/2010 | Lieberman et al. | |

FOREIGN PATENT DOCUMENTS

| | | |
|---|---|---|
| JP | 2009-199495 | 9/2009 |
| JP | 2010-097396 | 4/2010 |

OTHER PUBLICATIONS

Uno (Machine Translation of JP2010-097396, Feb. 30, 2010).*
European Patent Office, Extended European Search report issued in connection with European Patent Application No. 11006321.1, dated May 3, 2013. (7 pages).

* cited by examiner

*Primary Examiner* — Brian Shaw
(74) *Attorney, Agent, or Firm* — K&L Gates LLP

(57) ABSTRACT

A management device of the emission amount or reduction amount of greenhouse gases including: a communication unit that performs communication with an IC card on which an ID and history information on activities outside of a designated area are recorded; a control unit that performs authentication by the read ID via the communication unit, and in a case when authentication is successful, reads the history information via the communication unit, and obtains information relating to the emission amount or reduction amount of greenhouse gases from the read history information; and a display unit that displays the information relating to the emission amount or reduction amount of greenhouse gases.

9 Claims, 11 Drawing Sheets

MANAGEMENT DEVICE OF EMISSION AMOUNT OR REDUCTION AMOUNT OF GREENHOUSE GASES, AND MANAGEMENT METHOD

CROSS REFERENCES TO RELATED APPLICATIONS

The present application contains subject matter related to that disclosed in Japanese Priority Patent Application JP 2010-180091 filed in the Japan Patent Office on Aug. 11, 2010, the entire contents of which are hereby incorporated by reference.

BACKGROUND

The present application relates to a management device of the emission amount or reduction amount of greenhouse gases that is able to securely collect reliable information relating to the emission amount or reduction amount of greenhouse gases, for example, outside of the home, and a management method.

Recently, there has been demand to suppress energy consumption within factories, office buildings, and households. A system of managing the emission amount of carbon dioxide (hereinafter, also referred to as $CO_2$) is described in Japanese Unexamined Patent Application Publication No. 2009-199495. Here, although there are greenhouse gases other than carbon dioxide, in the description below, since $CO_2$ is the main greenhouse gas, description will be made with $CO_2$ in place of greenhouse gases.

Japanese Unexamined Patent Application Publication No. 2009-199495 is a system that ascertains the emission amount of $CO_2$ and the power usage amount for each position, aggregates the $CO_2$ emission of each position by a management device, and determines whether or not $CO_2$ emission at each device group of each position is equal to or below a target value. The disclosure described in Japanese Unexamined Patent Application Publication No. 2009-199495 manages $CO_2$ emission in a semiconductor device production facility.

Techniques to manage home energy use are referred to as HEMS (Home Energy Management System). An HEMS of the related art performed measures for energy conservation such as on/off control of electrical appliances such as air conditioners and collecting logs of power consumption amounts and the like. It is proposed that the management of energy is further developed, household $CO_2$ emission is made to be seen as a carbon footprint, and $CO_2$ emission is reduced. In this case, consumption of power generated as renewable energy is treated as if $CO_2$ emission is practically 0.

SUMMARY

The management of household $CO_2$ emission of the related art was usually limited to $CO_2$ emission within the home, and very little management of $CO_2$ emission outside of the home was possible. Even if calculating $CO_2$ emission is possible by self-reporting the use of public transport and the like outside of the home to a $CO_2$ emission calculating organization, there is a problem in that, because of self-reporting, reliability is poor. By considering accurate information on $CO_2$ emission emitted by, in addition to $CO_2$ emission within the home, activities outside of the home, it is possible to collect information on $CO_2$ emissions that is better adapted to actual concerns.

It is desirable to provide a management device of the emission amount or the reduction amount of greenhouse gases that is able to ascertain the amount of $CO_2$ emission caused by activities outside of the home with high reliability, and a management method.

The device disclosed according to an embodiment is a management device of the emission amount or reduction amount of greenhouse gases including: a communication unit that performs communication with an IC card on which an ID and history information on activities outside of a designated area are recorded; a control unit that performs authentication by the read ID via the communication unit, and in a case when authentication is successful, reads the history information via the communication unit, and obtains information relating to the emission amount or reduction amount of greenhouse gases from the read history information; and a display unit that displays the information relating to the emission amount or reduction amount of greenhouse gases.

The method disclosed according to another embodiment is a management method of the emission amount or reduction amount of greenhouse gases including: communicating with an IC card on which an ID and history information on activities outside of a designated area are recorded; controlling to perform authentication by the ID read via the communicating with the IC card, and in a case when authentication is successful, read the history information via the communicating with the IC card, and obtain information relating to an emission amount or reduction amount of greenhouse gases from the read history information; and displaying the information relating to the emission amount or reduction amount of greenhouse gases.

According to at least one of the embodiments, since the reliability of the history information recorded on the IC card is high, information relating to the emission amount or reduction amount of greenhouse gases caused by activities outside of an area, for example, outside of the home, is able to be accurately obtained.

Additional features and advantages are described herein, and will be apparent from the following Detailed Description and the figures.

DETAILED DESCRIPTION

Here, although the embodiments disclosed below are preferable specific examples and there are various limitations that are technically preferable, in the description below, the scope is not limited to such embodiments unless there is a specific statement to limit the disclosure.

1. Embodiment

Example of Management Device of $CO_2$ Emission Amount or Reduction Amount

An example of the management device of the $CO_2$ emission amount or reduction amount within a designated area, for example, within the home, will be described with reference to FIG. 1. Here, in the description below, the $CO_2$ reduction amount will be described as an example. The $CO_2$ reduction amount denotes, as an example, the difference from a standard $CO_2$ emission amount set in advance. Taking, for example, the area of the house, the location of the house, the number of people within the household, and the like into consideration, the standard $CO_2$ emission amount is set by businesses, government organizations, organizations entrusted by government organizations, or the like. The difference between the standard $CO_2$ emission amount and the actual $CO_2$ emission amount is the $CO_2$ reduction amount. In a case when the actual $CO_2$ emission amount exceeds the standard $CO_2$ emission amount, the $CO_2$ reduction amount is displayed, for example, using a negative notation.

Figure 1:
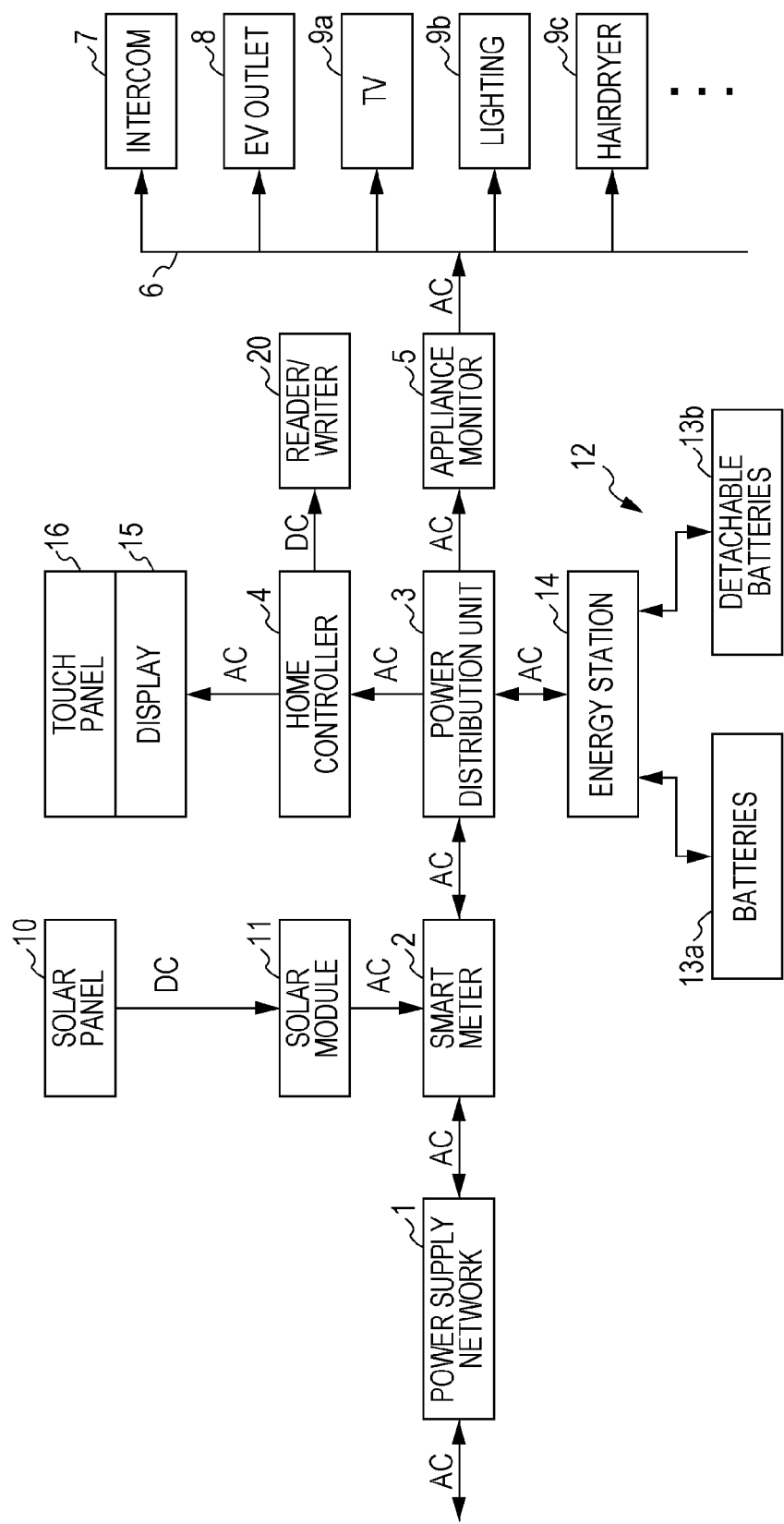
FIG. 1 is a block diagram illustrating the power system of one embodiment of the management device of the emission amount or reduction amount of greenhouse gases.
Figure 2:
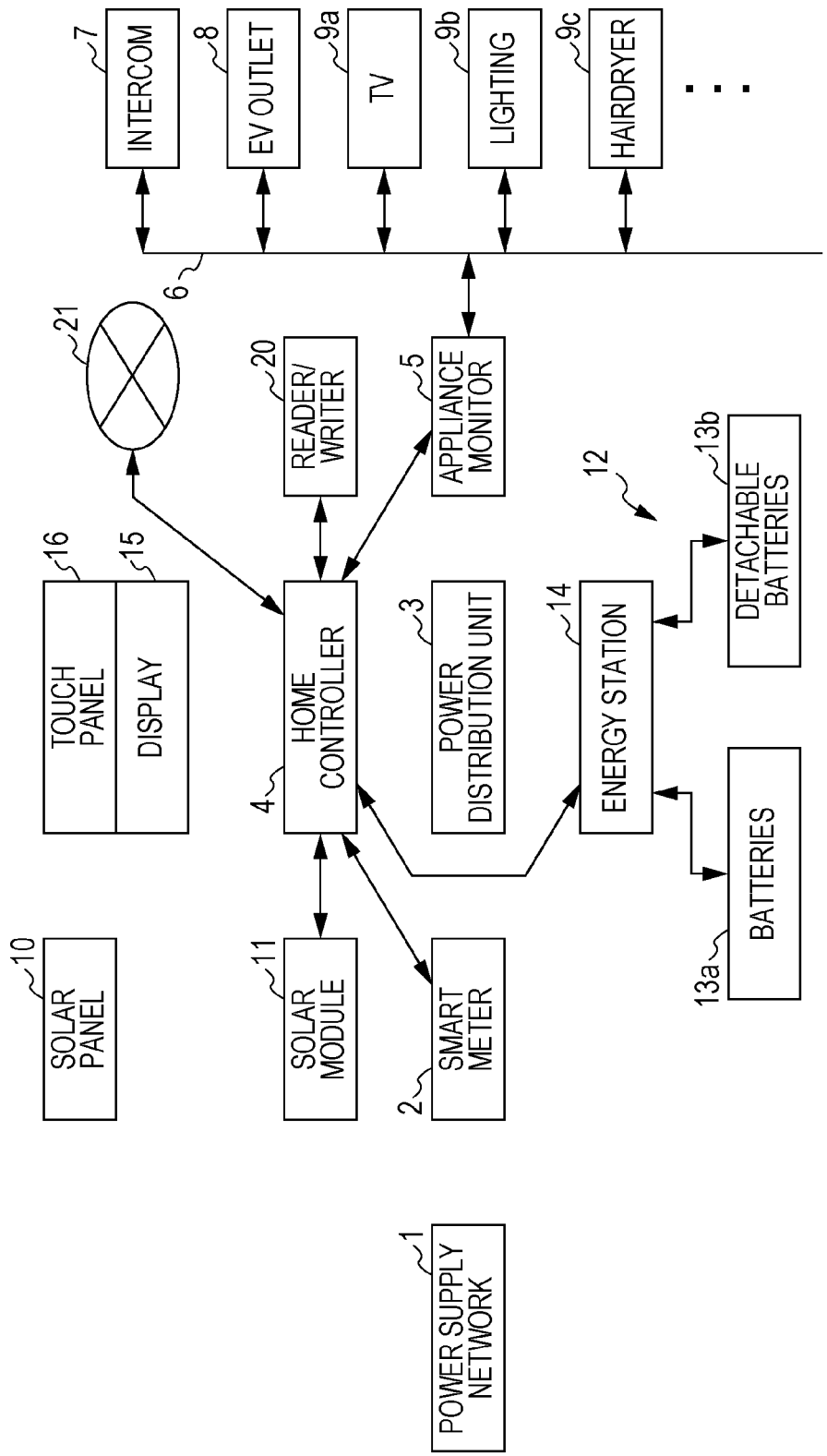
FIG. 2 is a block diagram illustrating the communication system of another embodiment of the management device of the emission amount or reduction amount of greenhouse gases.

FIG. 1 illustrates the supply pathway of electric power, and the transmission pathway of information data, control signals, and the like are illustrated in FIG. 2. Direct current (DC) and alternating current (AC) are illustrated as the types of electric power. For example, AC power of 100 V (60 Hz) (Japan) and 220 V (60 Hz) (Europe) are used in electric power networks within households.

Electric power generated at power stations is drawn into a household through a power supply network 1 via a household smart meter 2. Power stations are thermal power stations, nuclear power stations, and the like. The $CO_2$ emission amount of the power supplied to households through the power supply network 1 differs depending on the power generation method. Further, the fee by which a homeowner purchases power supplied by power suppliers changes according to time bands within a day. For example, the fee is set cheaply by displaying the nighttime power fee, when demand for power is low, as the daytime fee.

As illustrated in FIG. 2, the smart meter 2 is connected to a home controller 4 that manages household power by a home network, for example, a wireless LAN (Local Area Network). Apparatuses that are connected to one another by the wireless LAN are authenticated by mutual authentication. Further, in order to ensure security, data that is transmitted by the wireless LAN is encrypted. Here, other than the wireless LAN, a wired LAN may be used as the home network.

The smart meter 2 performs accurate measurement of the power supplied to the household by the power supply network 1 at predetermined cycles and transmits the measurement value to the home controller 4 of a household power network by a communication unit through a wireless LAN. In this case, the measurement time is transmitted along with the measurement value as a time stamp. The time is time information that is common with the power network. For example, a reference time generation source is provided on the network.

Commercial power that enters the home through the smart meter 2 is supplied to a power distribution unit 3. The power distribution unit 3 is an appliance including a plurality of power source plugs for supplying AC power. AC power is supplied to the home controller 4 and an appliance monitor 5 from the power distribution unit 3. AC power is supplied to electrical appliances within the home through the appliance monitor 5 and a power line 6.

AC power is supplied, for example, to an intercom 7, an EV (Electric Vehicle) outlet 8, a television device 9a, a lighting device 9b, and a hairdryer 9c. HEVs (Hybrid Electric Vehicle) and electric motorcycles are also able to connect to the EV outlet 8 for charging. Here, such electrical appliances are examples, and more types of electrical appliances are used within homes.

The appliance monitor 5 measures the power consumption amount of each electrical appliance connected thereto at predetermines cycles, for example, at one second cycles. The measured power consumption information on each electrical appliance and the time stamp that indicates the measurement time are transmitted from the appliance monitor 5 to the home controller 4 by wireless communication.

DC power generated by a solar panel 10 configured by photovoltaic solar cells is supplied to a solar module 11. AC power that is synchronized with the AC power within the home is produced at the solar module 11. The AC power that is produced is supplied to the smart meter 2. The AC power from the power supply network 1 and the AC power from the solar module 11 are added in the smart meter 2 and used as household electric power. Without limiting to the solar panel 10, a wind-powered generator or the like that performs generation by renewable energy may be used as the power generation device.

The solar module 11 is connected to the home controller 4 by a wireless LAN. The solar module 11 measures the DC power generated by the solar panel 10 and the AC power amount that is the converted DC power supplied to a power network. The measurement value and the time stamp that indicates the measurement time are transmitted from the solar module 11 to the home controller 4 by wireless communication.

As a household power storage device, an electrical storage device 12 composed of, for example, relatively large fixed batteries 13a and detachable batteries 13b is provided. The batteries 13a and 13b are, for example, lithium ion batteries. An electrical double layer may be used as the electrical storage device 12. An energy station 14 is provided in order to manage the operation of charging or discharging the batteries 13a and 13b of the electrical storage device 12, and to convert the DC power accumulated at the electrical storage device 12 into AC power. The electrical storage device 12 and the energy station 14 are connected by a wired interface. For example, an SPI (Serial Peripheral Interface) is able to be used. AC power from the energy station 14 is supplied to the power distribution unit 3.

The energy station 14 is provided with a plurality of sockets as physical connection portions. The batteries 13b are inserted and withdrawn to and from the sockets. Different types are able to be used as the batteries 13b. For example, lithium ion batteries, capacitors, fuel cells, micro cogenerators, and the like are able to be used. Each battery is made to be uniquely identifiable by a secure battery identifier (battery ID). Even if the types are different, all of the batteries are able to be inserted into standardized sockets.

The sockets ensure physical connection, and ensure the interface between the batteries 13b and the energy station 14. The energy station 14 manages the state of the batteries 13a and 13b, and monitors safety and reliability. The energy station 14 is connected to the home controller 4 by a wireless LAN. The home controller 4 receives information from the energy station 14 and transmits control signals relating to the batteries 13a and 13b to the energy station 14.

Here, the home controller 4 is connected to a battery profile server on the Internet 21 via an ADSL (Asymmetric Digital Subscriber Line), optical fibers, or the like. By receiving storage information corresponding to the battery ID from the server, the home controller 4 is able to safely and appropriately charge the batteries. Further, usage result information (number of charges, malfunctions, and the like) of the batteries is transmitted from the home controller 4 to the server, and the storage information on the server database is updated to the most recent version.

A display 15 is connected to the home controller 4 by a wireless LAN, and display information is transmitted from the home controller 4 to the display 15. The display 15 displays information shown in the examples below or a portion of the states thereof to a user within the home.

Power supplied to the household from the power supply network 1

Power supplied from the solar panel 10

Net power led to the energy station 14

State of the batteries on the energy station 14

Power consumed by electrical appliances within the home

Ratio between green power and non-green power of used energy

Carbon emission levels of power usage in real time

Carbon footprint of power consumed by the power network of the household (for example, displaying the value of emitted greenhouse gases (carbon emission levels) added over one month as a carbon footprint and making the carbon emission levels visible)

The information described above that is displayed on the display 15 is displayable on a mobile display on the Internet 21. The mobile display is a mobile phone, a mobile personal computer, or the like. Further, it is possible to transmit a control signal for controlling the power network to the home controller 4 of a household using such mobile terminals.

In a case when the carbon emission levels within the home is ascertained, a server on the Internet 21, specifically, an API (Application Program Interface) may be accessed, information such as the power consumption of the household may be transmitted to the API, and the carbon emission levels may be calculated by the API. One example of the API is an AMEE (Avoiding Mass Extinctions Engine). The AMEE collects energy data from around the world and saves a variety of forms of energy consumption data collected over an extended period of time. The home controller 4 is able to obtain information relating to the $CO_2$ emission amount of the subject home in accordance with a profile prescribed by the AMEE.

The home controller 4 is able to control, based on carbon emission levels calculated by itself or carbon emission levels calculated by the API, when energy is stored as power at the electrical storage device 12, and further, when such energy is supplied from the electrical storage device 12. Further, the allocation of storing and supplying is able to be controlled.

Not only is the $CO_2$ reduction amount within the home managed, but the $CO_2$ reduction amount involved in the activities of the homeowner and family members outside of the home is managed. History information on activities outside of the home is able to be obtained from an IC card. A reader/writer 20 for reading the information on the IC card and writing information onto the IC card is connected to the home controller 4.

A non-contact IC card is for performing bidirectional communication between itself and the reader-writer 20, and is able to be operated by electromagnetically inducted power by a carrier transmitted from the reader-writer 20. As such a type of IC card, one with a FeliCa (registered trademark of Sony Corporation) IC chip installed thereon is known. In the description below, an IC card with such a FeliCa (registered trademark of Sony Corporation) IC chip installed thereon will be used. However, an embodiment in which an IC chip is installed on a mobile phone, a key ring, or the like other than an IC card is also possible.

Since mutual authentication is performed and communication contents are encrypted, IC cards have high security, and are widely used as IC cards having functions as travel cards and electronic money, as IC cards having both of an electronic money function and a credit function, and the like. Further, in a case when EV charging stations are established in the future, there is a possibility that IC cards will be used for the payment of fees. In this case, there is an advantage in that by installing an IC chip on a car key ring, there is no need to have an IC card for payments.

Management of $CO_2$ Emission Amount within the Home

The home controller 4 processes information relating to power obtained through the household network, accesses a website on the Internet 21 outside of the household as necessary, ascertains information relating to power consumption, information relating to the $CO_2$ reduction amount, and the like. The ascertained information is displayed on the display 15.

Figure 3:
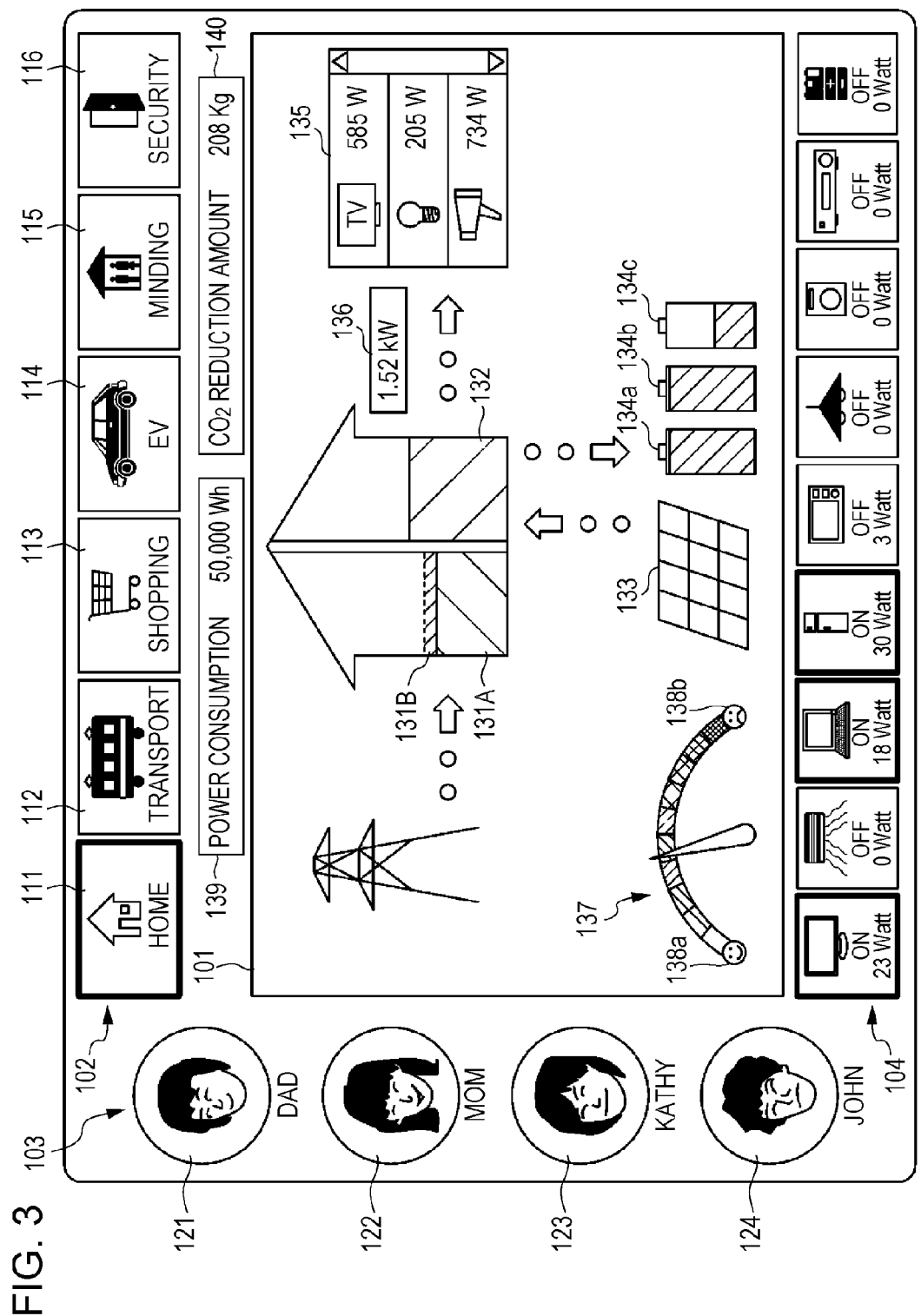
FIG. 3 is an outlined diagram illustrating a first example displayed on a display.

FIG. 3 is a display example in a case when information relating to the power consumption within the home, information relating to the $CO_2$ reduction amount, and the like are displayed on the display 15. The display by the display 15 is made by color display. An information display area 101 is arranged in the central portion of the display screen of the display 15. A menu selection area 102 is arranged above the information display area 101, a user selection area 103 is arranged in the vicinity of one side of the information display area 101, and an electrical appliance control area 104 is provided below the information display area 101.

A plurality of menu icons 111, 112, 113, 114, 115, and 116 is displayed in the menu selection area 102. Once the icon 111 is selected using a touch panel 16, the display moves on to a household $CO_2$ reduction amount management menu. The $CO_2$ reduction amount of each of user icons 121, 122, 123, and 124 displayed in the user selection area 103 may be ascertained, or the $CO_2$ reduction amount for the entire household may be ascertained. Icons of electrical appliances within the home are displayed in the electrical appliance control area 104.

A representation of the home is displayed in approximately the center of the information display area 101. The representation of the home is split in two, and on the left hand half facing the screen, a display 131A of the amount of power supplied to the household from the power supply network 1 is made. Ordinarily, since the power is non-green power (power in which carbon emission levels are relatively high), the power is displayed in red. However, in a case when there is green power (power in which carbon emission levels are relatively low) out of the power supplied from the power supply network 1, as indicated by the broken line, a display 131B (green) corresponding to the amount of green power is made. Such display 131A, 131B, and 132 are animated displays that change in real time.

A display 132 corresponding to the amount of green power generated by the solar panel 10 (In FIG. 3, indicated by an icon 133) is made on the right hand half facing the screen. Further, icons 134a, 134b, and 134c representing the storage amount of each of, for example, three batteries of the detachable batteries 13b that configure the electrical storage device 12 are displayed. Furthermore, an area 135 indicating electrical appliances within the home is provided, and the icon and current power consumption of each electrical appliance that is being operated is displayed within the area 135. A display 136 of the total present power consumption amount is made.

In addition, an indicator 137 is displayed. The position indicated by the needle of the indicator 137 represents the greenness (cleanness) of the amount of power that is currently being supplied to the household. An icon 138a on the left end of the indicator 137 is the most preferable position, and an icon 138b on the right end is the least preferable position. Therefore, the further the needle is to the left, the better the greenness, and the further the needle is to the right, the worse the greenness.

Furthermore, a display 139 of monthly (may be daily, weekly, or the like) cumulative power consumption and a display 140 of monthly (may be daily, weekly, or the like) cumulative $CO_2$ reduction amount are made between the information display area 101 and the menu selection area 102. In ascertaining the $CO_2$ reduction amount, the carbon emission levels of electric power according to the generation method is considered. From the interest of the user (homeowner), the $CO_2$ reduction amount is a meaningful value. For example, the $CO_2$ reduction amount is the basis of environmental subsidies provided by the government. Alternatively, the $CO_2$ reduction amount is tradable in a market of $CO_2$ reduction amounts.

In a case when a home icon 111 is selected in the menu selection area 102, the state (on/off) and power consumption of electrical appliances within the home are displayed in the electrical appliance control area 104. By pressing the icon corresponding to an electrical appliance of the electrical appliance control area 104, the user may be able to control the on/off states of the electrical appliance. For example, if an icon is pressed, a control screen suited for the control of the electrical appliance corresponding to the icon is displayed, and remote control of the on/off states of power or the like is possible.

Management of $CO_2$ Reduction Amount Outside of the Home

History information on activities outside of the home is recorded on the IC card. Activities outside of the home are either use of public transport, shopping, or use of a car (motorcycle) in which electric power forms at least a part of the motive power thereof. If the IC card is brought adjacent to the reader/writer 20 that is a communication unit, mutual authentication is performed between the IC card and the reader/writer 20. If the mutual authentication is successful, the history information recorded on the IC card is read by the reader/writer 20. The home controller 4 obtains information relating to the greenhouse gas reduction amount from the read history information. The obtained information relating to the greenhouse gas reduction amount is displayed on the display 15. The home controller 4 associates the obtained information relating to the greenhouse gas reduction amount with the ID recorded on the IC card and stores the information on a storage device, for example, a hard disk.

Use of IC Card Travel Ticket

Figure 4:
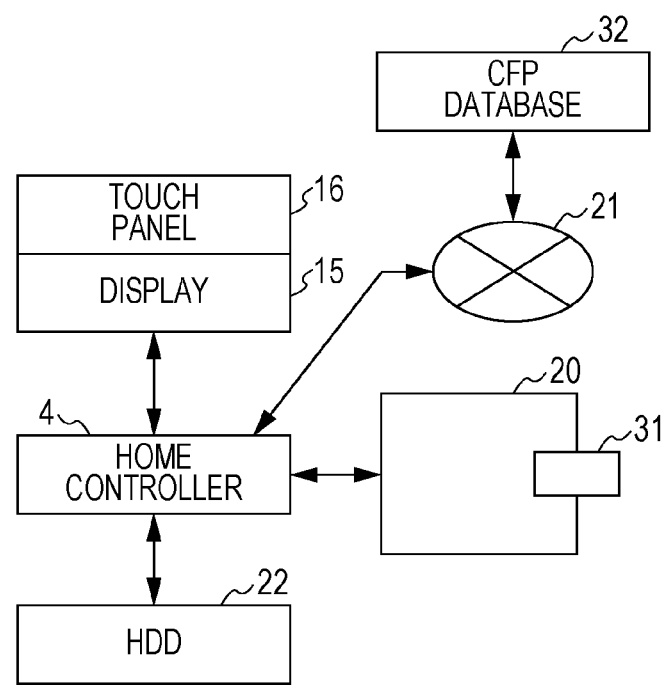
FIG. 4 is a block diagram used to describe a second example of the management device of the emission amount or reduction amount of greenhouse gases.

A first example of managing the $CO_2$ reduction amount outside of the home reads public transport usage history information from an IC card travel ticket and obtains information on the $CO_2$ reduction amount brought about by the use of public transport. In a state in which a transport icon 112 is selected in the menu selection area 102, as illustrated in FIG. 4, if an IC card travel ticket 31 is brought adjacent to the reader/writer 20, mutual authentication is made, and if the authentication is successful, travel (usage) history information on, for example, railroads, recorded on the IC card travel ticket 31 is read.

Travel history information read by the reader/writer 20 is provided to the home controller 4. The home controller 4 accesses a carbon footprint database 32 of the railroad company or the business that issues the IC card travel ticket 31 through the Internet 21 and logs in. An enquiry including the ID and the travel history information of the IC card travel ticket 31 is transmitted from the home controller 4 to the carbon footprint database 32. The enquiry is automatically made as a result of reading the IC card travel ticket 31. However, an enquiry may be made by accessing a homepage and inputting an ID, a password, and the like.

With the carbon footprint database 32, in response to an enquiry, data of a carbon footprint corresponding to an ID and the history information of an IC card travel ticket 31 is searched, and the data of the carbon footprint is transmitted to the home controller 4. The home controller 4 calculates the $CO_2$ reduction amount compared to the standard $CO_2$ emission amount from the received data of the carbon footprint, and stores the data of the $CO_2$ reduction amount on a storage device 22. The storage device 22 stores the data of the $CO_2$ reduction amount for each user. The home controller 4 logs in to a card user account of the storage device 22 based on the ID of the IC card travel ticket 31 and stores the data of the $CO_2$ reduction amount.

The storage device 22 stores the accumulated value of the data of the $CO_2$ reduction amount for each user of the IC card. The accumulated value is the accumulated value for a predetermined time period such as one month. The storage device 22 is related to the home controller 4 and is provided inside the home or outside of the home (for example, on the Internet). Once the home controller 4 reads the accumulated value of the $CO_2$ reduction amount from the storage device 22, the accumulated value is displayed by the display 15 by a control of the home controller 4.

Figure 5:
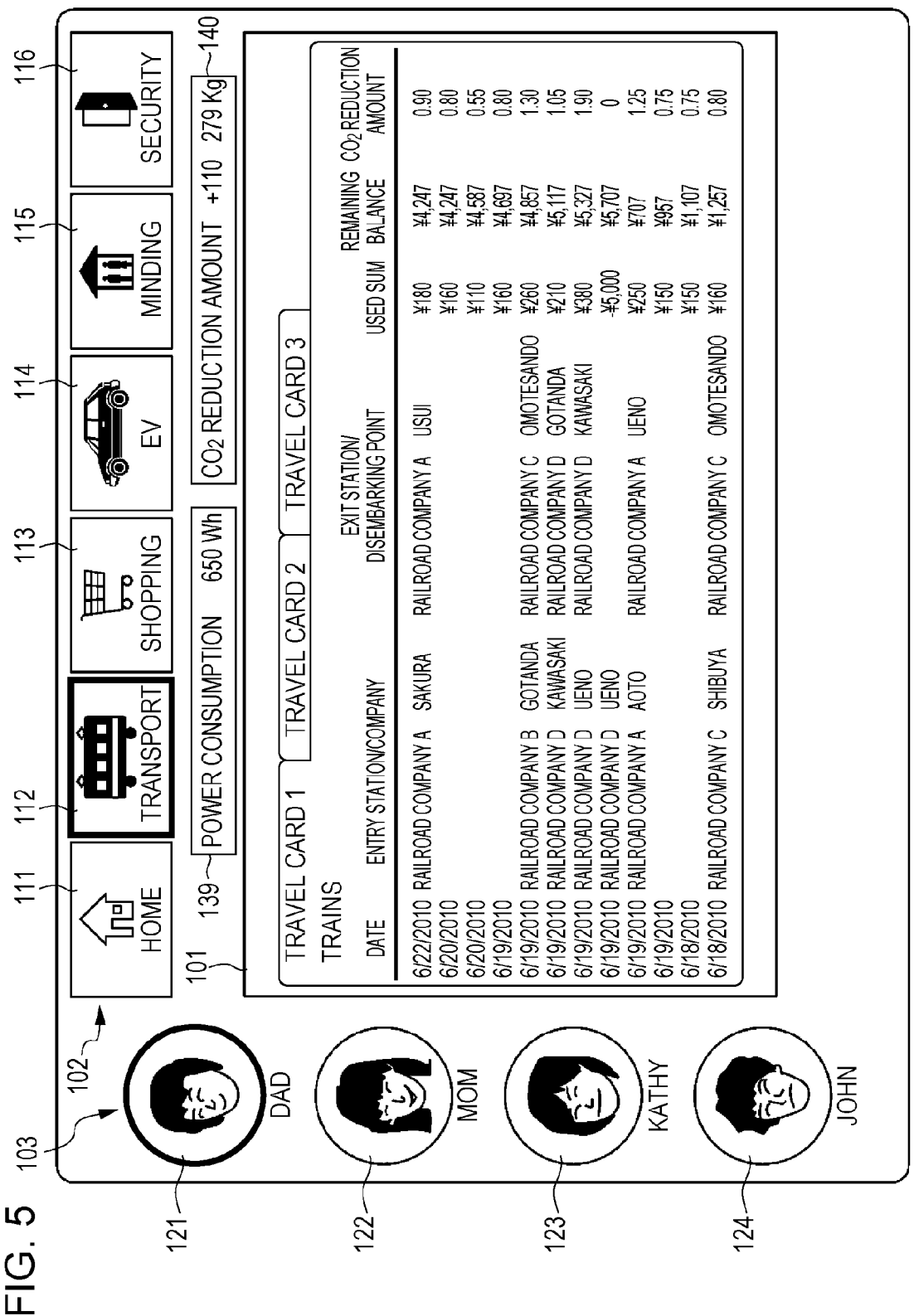
FIG. 5 is an outlined diagram illustrating the second example displayed on a display.

As illustrated in FIG. 5, information relating to the $CO_2$ reduction amount is displayed on the display 15 by the travel history information of the IC card travel ticket 31. The travel history information of the IC card travel ticket 31 read by the reader/writer 20 is displayed in the information display area 101. The travel history information displays the entry station, the exit station, the used sum, and the balance for each date. Information on the carbon footprint is obtained from the carbon footprint database 32 and the $CO_2$ reduction amount is ascertained by the home controller 4. Further, the $CO_2$ reduction amount stored on the storage device 22 is displayed in the information display area 101.

In addition, on the upper side of the information display area 101 are the current home power consumption display 139 and the cumulative $CO_2$ reduction amount display 140. Here, the cumulative $CO_2$ reduction amount display 140 may be any of a value indicating the $CO_2$ reduction amount relating to transportation, a value indicating the $CO_2$ reduction amount of everything outside of the home, or a value indicating the $CO_2$ reduction amount of everything inside and outside of the home. Further, either of the value of the $CO_2$ reduction amount relating to individual users or the value of the $CO_2$ reduction amount relating to all users within the home is possible.

In the menu selection area 102, out of the plurality of menu icons, the transport icon 112 is selected. Further, a user icon 121 that corresponds to the ID of the IC card travel ticket 31 read by the reader/writer 20 is displayed distinguished from the other user icons.

Other Examples of Transport Card

Figure 6:
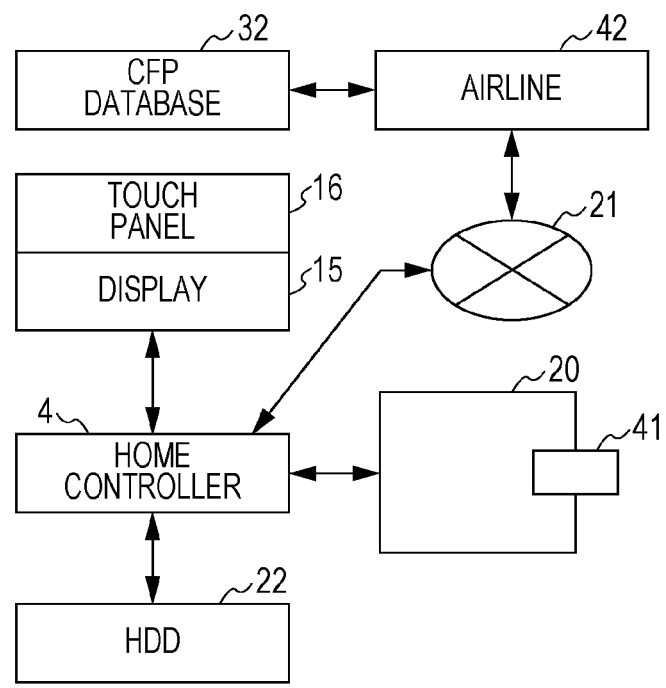
FIG. 6 is a block diagram used to describe a third example of the management device of the emission amount or reduction amount of greenhouse gases.

The IC card travel ticket 31 is usable for trains, buses, and the like. As public transport used by a user, there may be a case where airplanes are included. The user ID and data of flight history information are recorded on IC cards (so-called mileage cards) issued by airlines. Information on the $CO_2$ reduction amount is able to be obtained from the flight history information. In a state in which the transport icon 112 is selected in the menu selection area 102, as illustrated in FIG. 6, when an IC card 41 on which the flight history is recorded is brought adjacent to the reader/writer 20, mutual authentication is performed, and if the authentication is successful, the flight (use) history information of airplanes recorded on the IC card 41 is read.

The travel history information read by the reader-writer 20 is supplied to the home controller 4. The home controller 4 accesses the website 42 of the airline or business that issues the IC card 41 through the Internet 21 and logs in. An enquiry including the ID and the flight history information of the IC card 41 is transmitted from the home controller 4 to the website 42. The enquiry is performed automatically as a result of the reading of the IC card 41. However, the enquiry may be made by accessing the website 42 and inputting an ID, a password, and the like.

The web site 42 transmits, upon receiving an enquiry, the contents of the enquiry to the carbon footprint database 32. The carbon footprint database 32 is, in response to the enquiry, searched for the data of the carbon footprint corresponding to the ID and the flight history information IC card 41, and the data of the carbon footprint is transmitted to the home controller 4 via the website 42. The home controller 4 calculates the $CO_2$ reduction amount compared to the standard $CO_2$ emission amount from the received data of the carbon footprint, and stores the data of the $CO_2$ reduction amount in the storage device 22. The storage device 22 stores data of the $CO_2$ reduction amount for each user. The home controller 4 logs in to the card user account of the storage device 22 based on the ID of the IC card 41 and stores the data of the $CO_2$ reduction amount.

The storage device 22 stores the accumulated value of the data of the $CO_2$ reduction amount for each user of the IC card. The accumulated value is the accumulated value for a predetermined time period such as one month. The storage device 22 is related to the home controller 4 and is provided inside the home or outside of the home (for example, on the Internet). When the home controller 4 reads the accumulated value of the $CO_2$ reduction amount from the storage device 22, the accumulated value is displayed by the display 15 by a control of the home controller 4.

Figure 7:
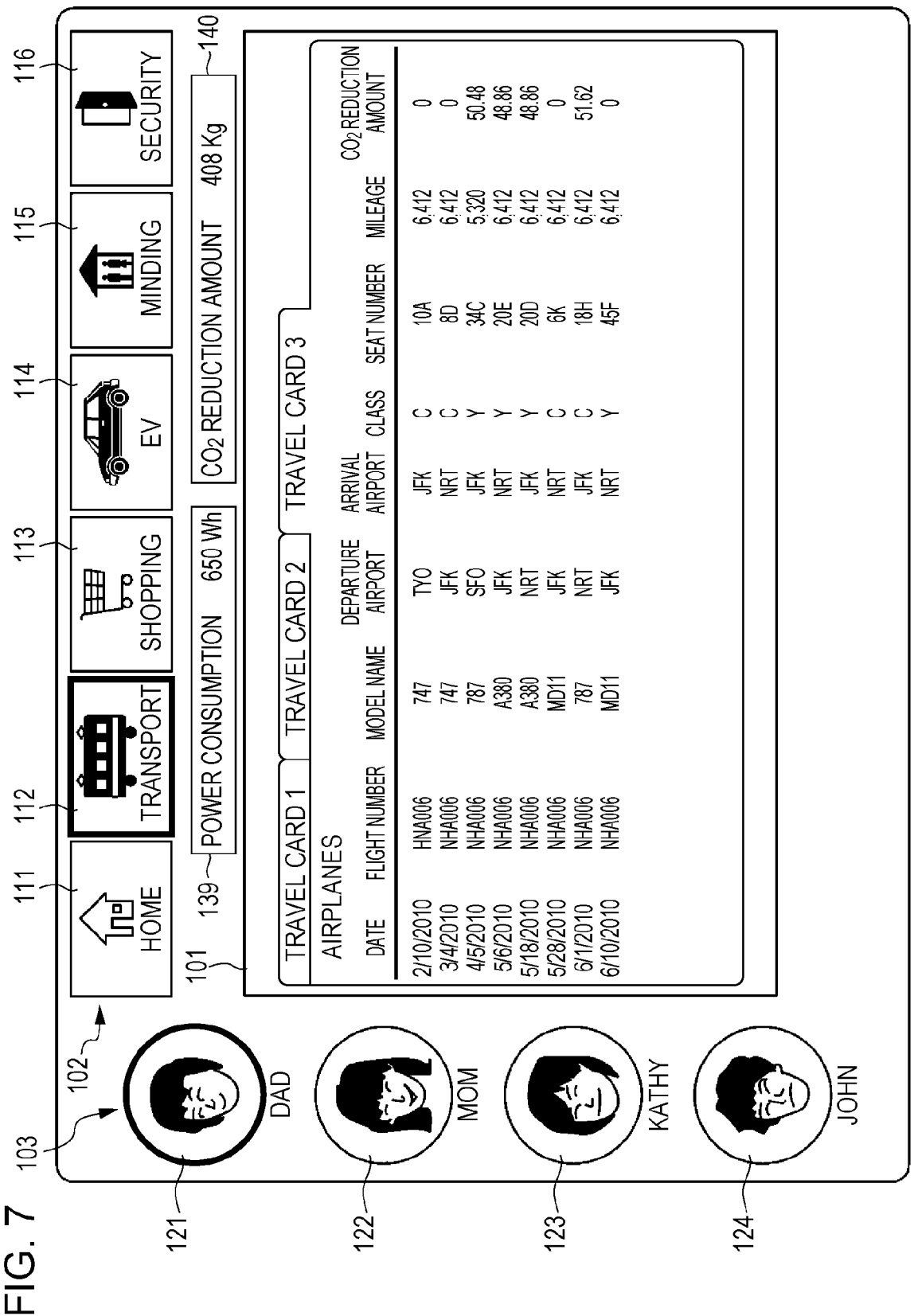
FIG. 7 is an outlined diagram illustrating the third example displayed on a display.

As illustrated in FIG. 7, by the flight history information of the IC card 41, information relating to the $CO_2$ reduction amount is displayed on the display 15. In the menu selection area 102, out of the plurality of menu icons, the transport icon 112 is selected. Further, the user icon 121 that corresponds to the ID of the IC card 41 read by the reader/writer 20 is displayed distinguished from the other user icons.

The flight history information of the IC card 41 read by the reader/writer 20 is displayed in the information display area 101. The flight history information displays the flight number, the model name, the departure airport, the arrival airport, the class, the seat number, and the mileage for each flight date. Information on the carbon footprint is obtained from the carbon footprint database 32, and the $CO_2$ reduction amount is ascertained by the home controller 4. Further, the $CO_2$ reduction amount stored in the storage device 22 is displayed in the information display area 101. Furthermore, similarly to the processing of the data of the IC card travel ticket 31 described above, on the upper side of the information display area 101 are the current home power consumption display 139 and the cumulative $CO_2$ reduction amount display 140.

Use of Electronic Money Card

Figure 8:
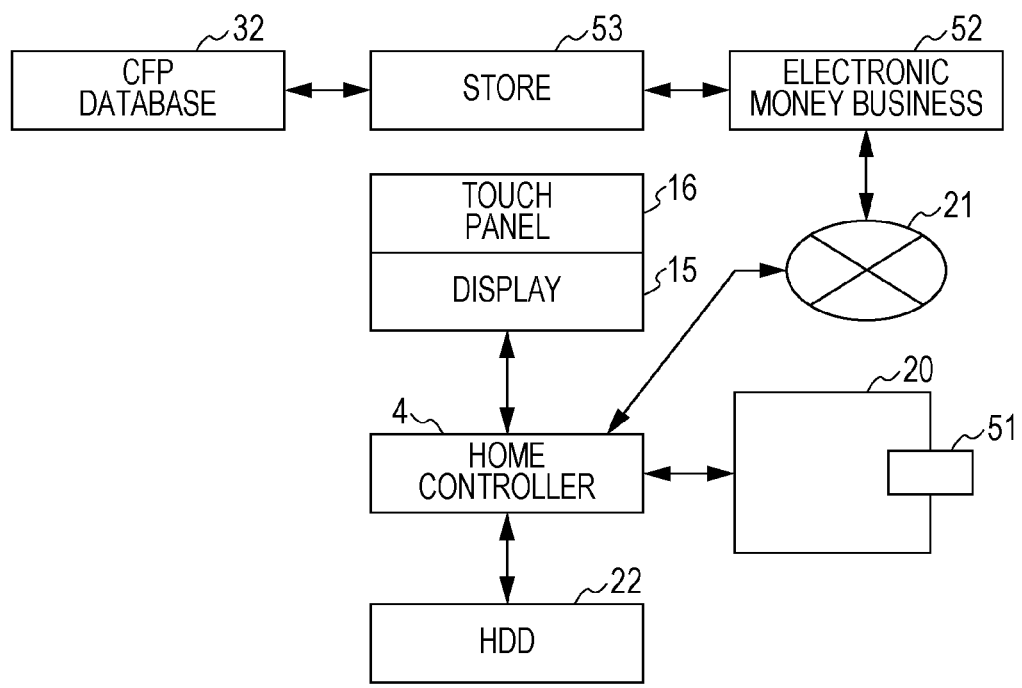
FIG. 8 is a block diagram used to describe a fourth example of the management device of the emission amount or reduction amount of greenhouse gases.

In a second example of the management of the $CO_2$ reduction amount outside of the home, in a case when electronic money is used for shopping outside, information on the $CO_2$ reduction amount is obtained using the carbon footprint of purchased goods. In a state in which a shopping icon 113 is selected in the menu selection area 102, as illustrated in FIG. 8, when an electronic money card 51 is brought adjacent to the reader/writer 20, mutual authentication is performed, and if the authentication is successful, shopping history information recorded on the electronic money card 51 is read.

The shopping history information read by the reader-writer 20 is supplied to the home controller 4. The home controller 4 accesses a shopping history server 52 of the business that issues the electronic money card 51 through the Internet 21 and logs in. An enquiry including the ID and the shopping history information of the electronic money card 51 is transmitted from the home controller 4 to the shopping history server 52. The enquiry is performed automatically as a result of the reading of the electronic money card 51. However, the enquiry may be made by accessing a homepage and inputting an ID, a password, and the like.

The shopping history server 52 obtains, in response to an enquiry, information on the carbon footprint of purchased goods from a server 53 of a store specified from the purchasing history. The store server 53 obtains information on the carbon footprint of purchased goods from the carbon footprint database 32 and transmits the information on the carbon footprint to the shopping history server 52 of the electronic money business. The shopping history server 52 transmits the obtained information on the carbon footprint to the home controller 4.

The home controller 4 calculates the $CO_2$ reduction amount compared to the standard $CO_2$ emission amount from the received data of the carbon footprint and stores the data of the $CO_2$ reduction amount in the storage device 22. The storage device 22 stores the data of the $CO_2$ reduction amount for each user. The home controller 4 logs in to the card user account of the storage device 22 based on the ID of the electronic money card 51 and stores the data of the $CO_2$ reduction amount.

The storage device 22 stores the accumulated value of the data of the $CO_2$ reduction amount for each user of the electronic money card 51. The accumulated value is the accumulated value for a predetermined time period such as one month. The storage device 22 is related to the home controller 4 and is provided inside the home or outside of the home (for example, on the Internet). When the home controller 4 reads the accumulated value of the $CO_2$ reduction amount from the storage device 22, the accumulated value is displayed by the display 15 by a control of the home controller 4.

Figure 9:
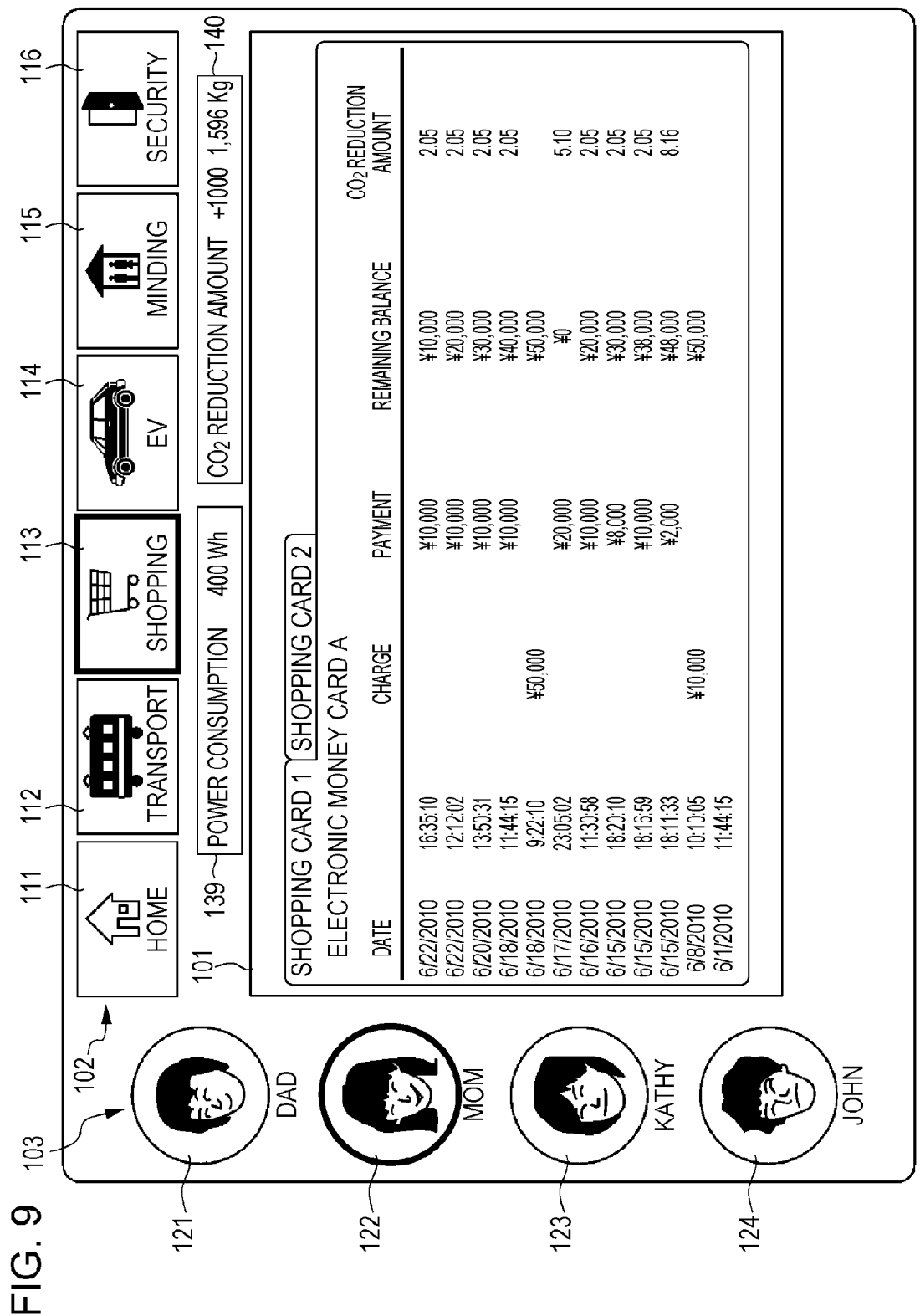
FIG. 9 is an outlined diagram illustrating the fourth example displayed on a display.

As illustrated in FIG. 9, by the shopping history information of the electronic money card 51, information relating to the $CO_2$ reduction amount is displayed on the display 15. The example illustrated in FIG. 9 is an example in which a user of the household owns two shopping cards. The shopping history information of the electronic money card 51 read by the reader/writer 20 is displayed in the information display area 101. The shopping history information displays the payment amount and the remaining balance for each date. Further, information on the charge is also displayed. The $CO_2$ reduction amount for each of the purchased goods is ascertained from the carbon footprint database 32 through the shopping history server 52. Further, the $CO_2$ reduction amount stored in the storage device 22 is displayed in the information display area 101 for each of the purchased goods. Furthermore, on the upper side of the information display area 101 are, as described above, the current home power consumption display 139 and the cumulative $CO_2$ reduction display 140.

In the menu selection area 102, out of the plurality of menu icons, the shopping icon 113 is selected. Further, the user icon 122 that corresponds to the ID of the electronic money card 51 read by the reader/writer 20 is displayed distinguished from the other user icons.

Here, the electronic money card may be the configuration of a mobile phone. Further, without being limited to electronic money, the $CO_2$ reduction amount is similarly ascertained and displayed for shopping with credit cards.

Use of EV User Card

Figure 10:
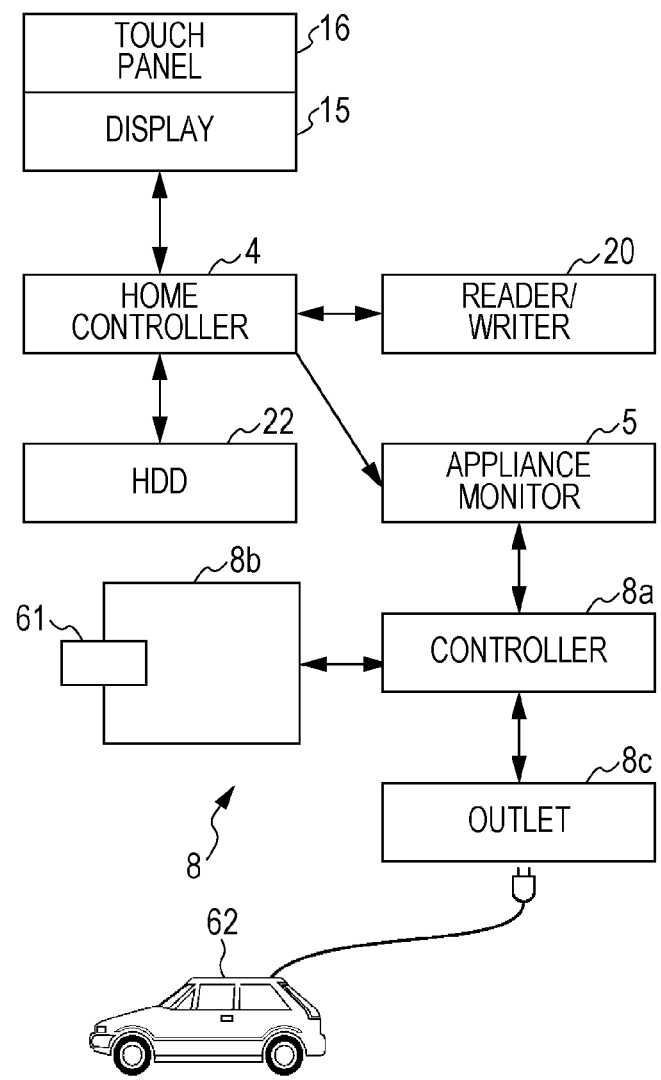
FIG. 10 is a block diagram used to describe a fifth example of the management device of the emission amount or reduction amount of greenhouse gases.

In a third example of the management of the $CO_2$ reduction amount outside of the home, the $CO_2$ reduction amount according to the use history of an EV (including HEVs and electric motorcycles) is ascertained by a user card of the EV, and the ascertained $CO_2$ reduction amount is displayed. In a state in which an EV icon 114 is selected in the menu selection area 102, as illustrated in FIG. 10, when an EV user card 61 is brought adjacent to a reader/writer 8b, mutual authentication is performed, and if the authentication is successful, EV history information recorded on the EV user card 61 is read.

The reader/writer 8b forms one portion of the EV outlet 8. The EV outlet 8 includes a controller 8a that is connected to be bidirectionally communicable, the reader/writer 8b, and the outlet 8c. Information read from the EV user card 61 by the reader/writer 8b is supplied to the controller 8a and information from the controller 8a is written into the EV user card 61.

An EV 62, for example, a PEV (Plug-in Electric Vehicle) is connected to the outlet 8c for charging. The outlet 8c and the controller 8a are connected, and information on the charge amount through the outlet 8c is transmitted to the controller 8a. The information on the charge amount is transmitted from the controller 8a to the appliance monitor 5, and the information on the charge amount is transmitted from the appliance monitor 5 to the home controller 4.

The EV user card 61 is configured by, for example, embedding an IC chip into the key ring for an EV. On the EV user card 61 is recorded, as well as the user ID, data of the travel distance and the cumulative travel distance as the use history of the EV 62. For example, the distance from the travel start time and the travel end time is obtained by communication with a computer for control of the EV 62 and recorded on the EV user card 61. Further, status information such as information on the charge state of the battery installed in the EV 62 is recorded on the EV user card 61.

The use history information and the status information read from the EV user card 61 is supplied to the controller 8a and transmitted from the controller 8a to the home controller 4 through the appliance monitor 5. The home controller 4 calculates the $CO_2$ reduction amount from the use history information and stores the information on the $CO_2$ reduction amount in the storage device 22 for each user ID. Here, the EV use history information may be made to be read by the reader/writer 20 inside the home by bringing the EV user card 61 adjacent to the reader/writer 20. Further, in order to ascertain the $CO_2$ reduction amount from use of the EV, a database of the carbon footprint relating to the EV may be accessed through the Internet.

The storage device 22 stores the accumulated value of the data of the $CO_2$ reduction amount for each user of the EV user card 61. The accumulated value is the accumulated value for a predetermined time period such as one month. The storage device 22 is related to the home controller 4 and is provided inside the home or outside of the home (for example, on the Internet). When the home controller 4 reads the accumulated value of the $CO_2$ reduction amount from the storage device 22, the accumulated value is displayed by the display 15 by a control of the home controller 4.

Figure 11:
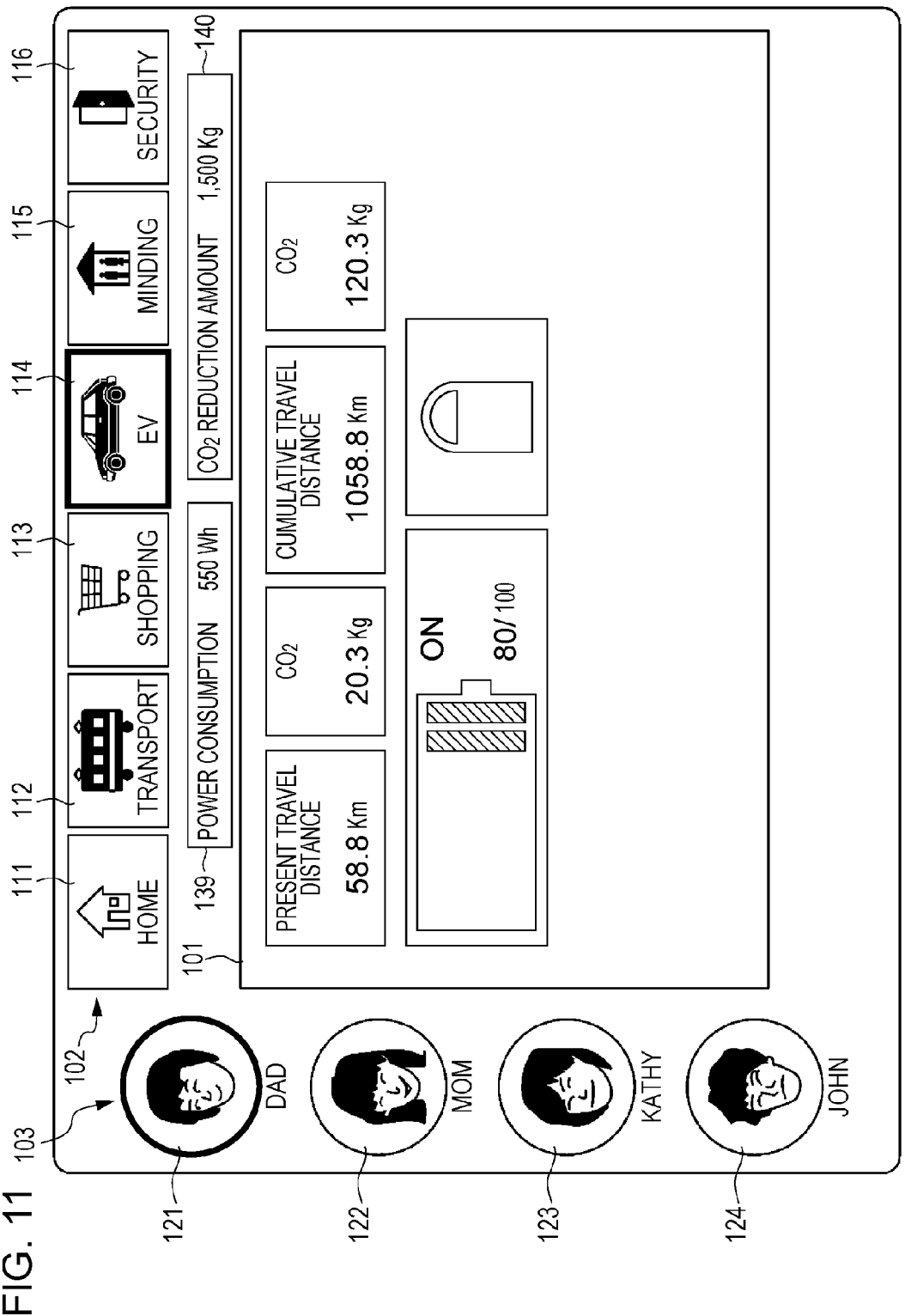
FIG. 11 is an outlined diagram illustrating the fifth example displayed on a display.

As illustrated in FIG. 11, by the use history information of the EV user card 61, information relating to the $CO_2$ reduction amount is displayed on the display 15. As illustrated in FIG. 11, EV history information of the EV user card 61 read by the reader/writer 8b is displayed in the information display area 101. The EV history information includes display of the present travel distance, display of the $CO_2$ reduction amount generated by the present travel distance, display of the cumulative travel distance, and display of the $CO_2$ reduction amount generated by the cumulative travel distance. Further, the charge state (on/off) and the charge state of the EV battery are displayed.

Here, as necessary, the status information on the EV, for example, information on switching on/off states of the lights may be obtained and the on/off states of the lights may be remote controlled.

Other Functions

A minding icon 115 and a security icon 116 are displayed in the menu selection area 102. When the minding icon 115 is selected, it is possible to access, through the Internet, and log in to, the home controller of the home of the grandparents in which the same home energy network as the subject home is implemented. Similarly to the monitoring within the subject home, it is possible to monitor the use situation of electric appliances and the like of the home of the grandparents. By this monitoring, it becomes possible to detect a situation in which "something is out of the ordinary", to call and speak to the other party by the intercom function on the same screen, and to verify whether or not there are any abnormalities.

If the security icon 116 is selected, the function of the intercom 7 provided in the entry hall of the subject home is called, and the function screen of the intercom is displayed in the information display area 101 of the display 15. The intercom is able to perform communication with an IC card (that has the function of an ID card). Although not shown in the drawings, the function screen of the intercom includes, for example, images from an imaging device provided in the entry hall, icons such as a talk button and an end button, use history of the intercom, and the like.

A reader/writer attached to the intercom 7 reads the IC card of a visitor and transmits the read ID to the home controller. The home controller performs referencing of transmitting the ID to a database on the Internet. Information on the person corresponding to the ID is notified to the home controller from the database, and if it is verified that the visitor is not a suspicious character, unlocking is performed. Otherwise, unlocking is not performed. History of information relating to such visitors is saved in a storage device. Since unlocking is performed based on the results of referencing a database, security is able to be improved.

2. Modification Example

Although an embodiment has been specifically described above, the disclosure is not limited to the above embodiment, and various modifications based on the technical ideas are possible. For example, a greenhouse gas emission amount or reduction amount device is able to be applied, without being limited to households, to designated areas.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A management device of an emission amount or reduction amount of greenhouse gases comprising:
a reader/writer configured to perform communication with a key ring including an IC chip on which (i) an ID is recorded, and (ii) history information on activities outside of a designated area are automatically recorded without a user self-reporting any history information on the activities outside of the designated area;
a control unit that performs authentication of the ID, which is received via the reader/writer, and in a case when authentication is successful, receives the history information, which is associated with the ID, from the key ring including the IC chip via the reader/writer, automatically transmits an enquiry including the ID and the history information, and based on the history information automatically recorded without any self-reporting by the user, ascertains information relating to the emission amount or reduction amount of greenhouse gases from the received history information;
an electric vehicle outlet comprising the reader/writer and the control unit which facilitates bidirectional communication between the reader/writer and the key ring; and
a display unit that displays the information relating to the emission amount or reduction amount of greenhouse gases.

2. The management device of the emission amount or reduction amount of greenhouse gases according to claim 1, wherein the control unit obtains information relating to the emission amount or reduction amount of greenhouse gases within the designated area and displays the information relating to the emission amount or reduction amount of greenhouse gases by the display unit.

3. The management device of the emission amount or reduction amount of greenhouse gases according to claim 1, comprising a storage device that associates and stores the information relating to the emission amount or reduction amount of greenhouse gases obtained by the control unit with the ID.

4. The management device of the emission amount or reduction amount of greenhouse gases according to claim 1, wherein the activities outside of the designated area include use of public transport, shopping, or use of a vehicle in which electric power forms at least a part of a motive power thereof.

5. The management device of the emission amount or reduction amount of greenhouse gases according to claim 1, wherein in a case when an activity outside of the designated area is use of public transport, information of use history of the public transport is received as the history information from the key ring including the IC chip to the control unit,
the control unit transmits the information of the use history to a server of the public transport, and
the control unit receives information relating to the emission amount or reduction amount of greenhouse gases corresponding to the use history from the server.

6. The management device of the emission amount or reduction amount of greenhouse gases according to claim 1, wherein in a case when the activity outside of the designated area is shopping, information on shopping history is received as the history information from the key ring including the IC chip to the control unit,
the control unit transmits the information on the shopping history to a server of businesses relating to the key ring including the IC chip, and
the control unit receives information relating to the emission amount or reduction amount of greenhouse gases of purchased goods corresponding to the information on the shopping history from the server.

7. The management device of the emission amount or reduction amount of greenhouse gases according to claim 1, wherein in a case when the activity outside of the designated area is use of vehicles, information on use history of vehicles as the history information is received from the key ring including the IC chip to the control unit, and
the control unit receives information relating to the emission amount or reduction amount of greenhouse gases corresponding to the use history from the server.

8. A management method of an emission amount or reduction amount of greenhouse gases comprising:
communicating, via a reader/writer, with a key ring including an IC chip on which (i) an ID is recorded, and (ii) history information on activities outside of a designated area are automatically recorded without a user self-reporting any history information on the activities outside of the designated area;
performing, via a control unit, authentication of the ID, which is received via the reader/writer communicating with the IC card, and in a case when authentication is successful, receiving the history information, which is associated with the ID, from the key ring including the IC chip via the reader/writer communicating with the key ring including the IC chip, automatically transmit an enquiry including the ID and the history information, and based on the history information automatically recorded without any self-reporting by the user, ascertain information relating to the emission amount or reduction amount of greenhouse gases from the received history information, wherein an electric vehicle outlet comprises the reader/writer and the control unit which facilitates bidirectional communication between the reader/writer and the key ring; and
displaying the information relating to the emission amount or reduction amount of greenhouse gases.

9. The management device of the emission amount or reduction amount of greenhouse gases according to claim 1, further comprising:
an intercom unit configured to call and speak to another party and perform communication with the key ring including the IC chip and the control unit, wherein responsive to the intercom unit reading an IC card of a visitor, the control unit additionally performs referencing of the read ID from the IC card of the visitor, and based on the referencing, a determination is made whether the visitor is allowed access.

* * * * *